United States Patent [19]

Thibault

[11] Patent Number: 5,277,471

[45] Date of Patent: Jan. 11, 1994

[54] QUICK-RELEASE LOCK FOR PICK-UP TRUCK TOPPER

[76] Inventor: Robert Thibault, 151, Chemin des Patriotes, St-Charles-sur-Richelieu, Québec, Canada, J0H 2G0

[21] Appl. No.: 981,100

[22] Filed: Nov. 24, 1992

[51] Int. Cl.$^5$ .............................. B60P 3/377
[52] U.S. Cl. ................................ 296/167
[58] Field of Search ............ 296/167, 100, 164; 410/77, 80

[56] References Cited

U.S. PATENT DOCUMENTS

| | | | |
|---|---|---|---|
| 3,503,647 | 3/1970 | Gostomski | 296/167 |
| 3,966,250 | 6/1976 | Winskas | 296/167 X |
| 4,231,610 | 11/1980 | Stoll | 296/167 |
| 4,239,430 | 12/1980 | Groene | 296/167 X |
| 4,796,942 | 1/1989 | Robinson et al. | 296/39.2 |
| 4,815,787 | 3/1989 | Hale | 296/167 |
| 5,046,775 | 9/1991 | Marcum et al. | 296/39.2 |

Primary Examiner—David M. Mitchell
Assistant Examiner—Gary C. Hoge
Attorney, Agent, or Firm—Pierre Lespérance; François Martineau

[57] ABSTRACT

The pick-up truck box supports a topper made of superimposed upper and lower half portions. The topper half portions are interconnected in edgewise fashion by a connector assembly. This connector assembly is also used as an anchor point for cupboards supported within the enclosure of the topper. The topper side walls are releasably anchored to the truck box side walls by a pivotal handle bar assembly. The latter includes a removable pivotable handle, projecting inside the topper enclosure, and a fulcrum end with an elastomeric pad to frictionally anchor the topper to the truck box. Release of the handle bar lock is possible only from within the topper enclosure.

6 Claims, 7 Drawing Sheets

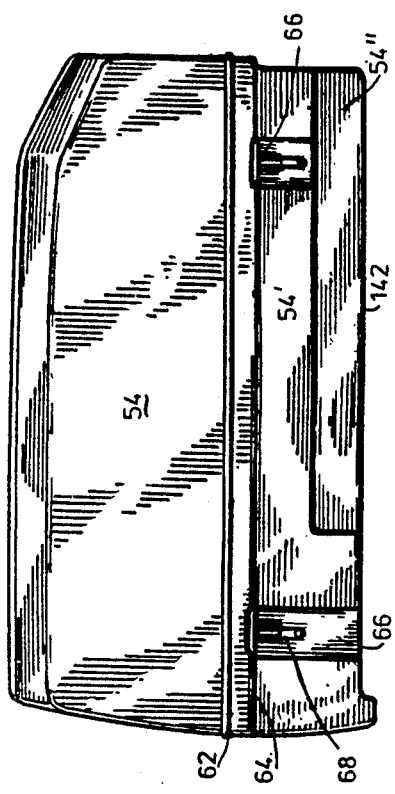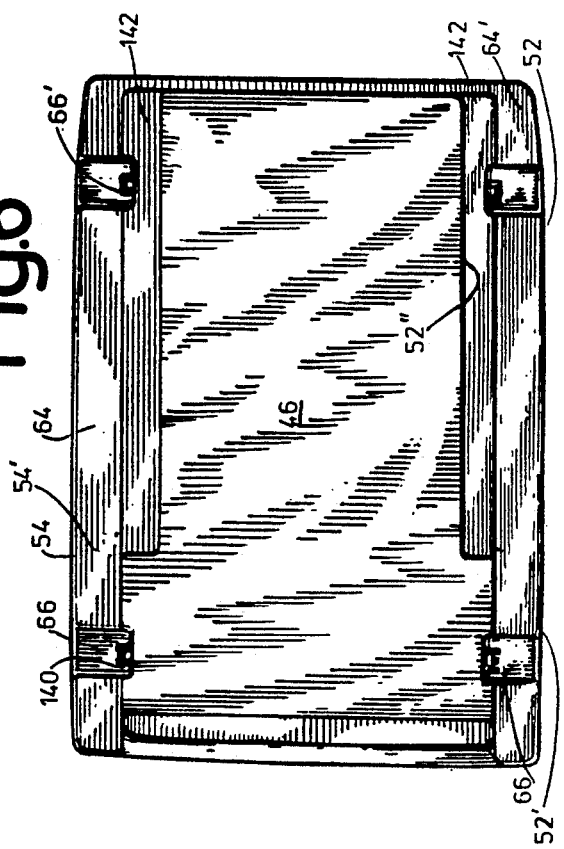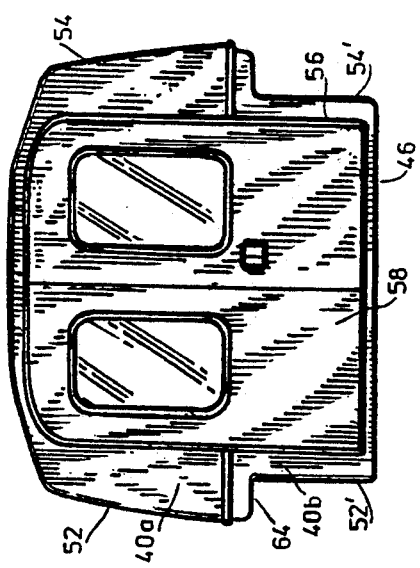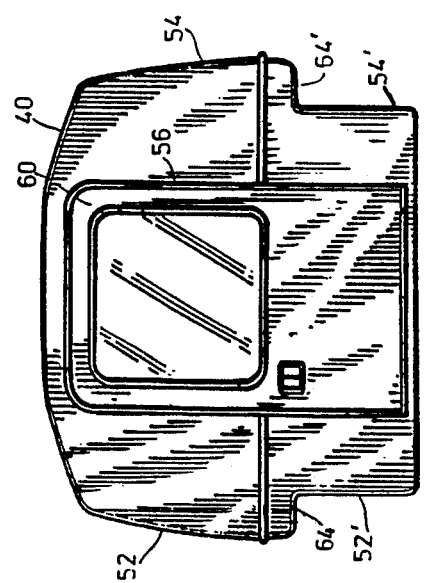

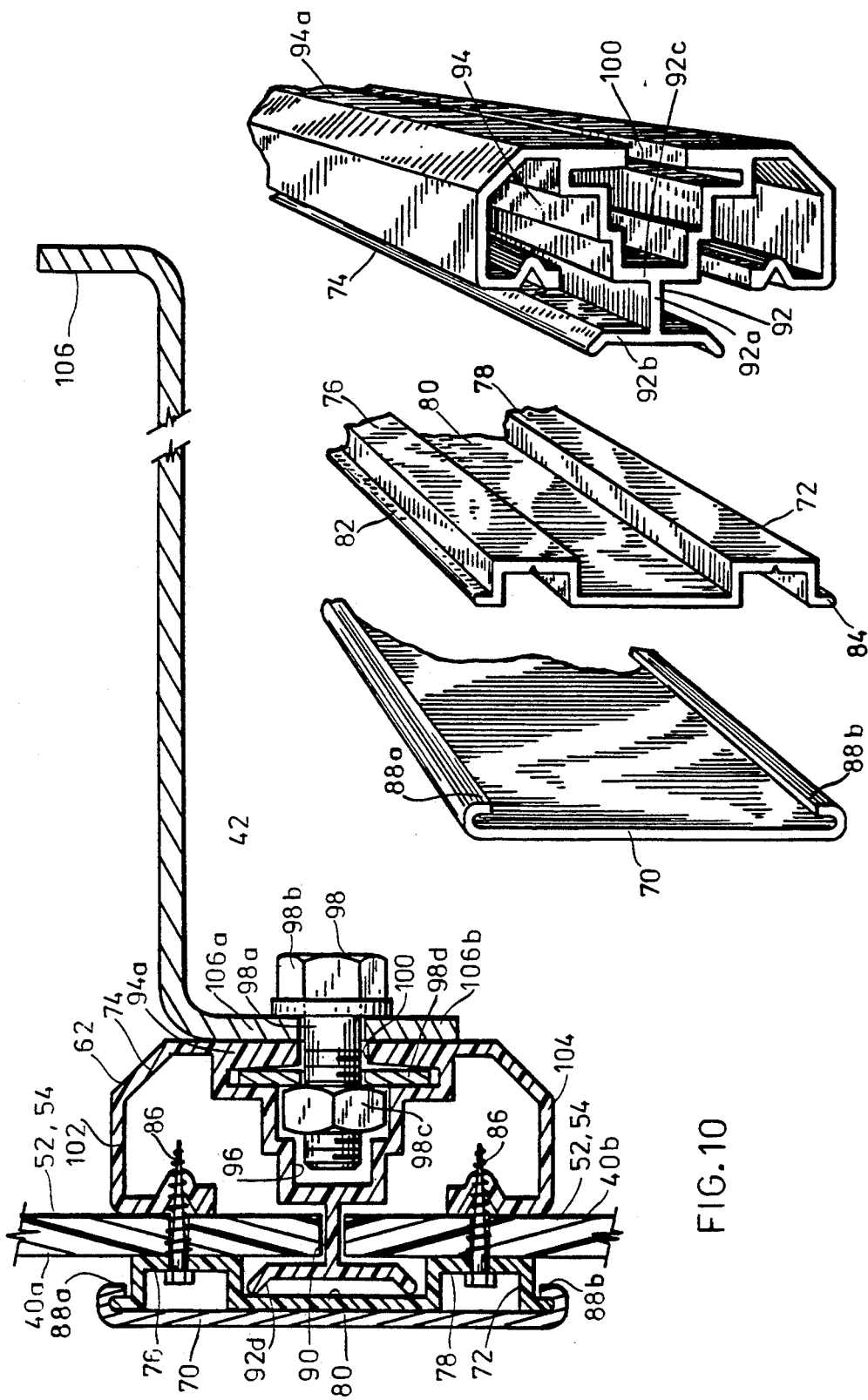

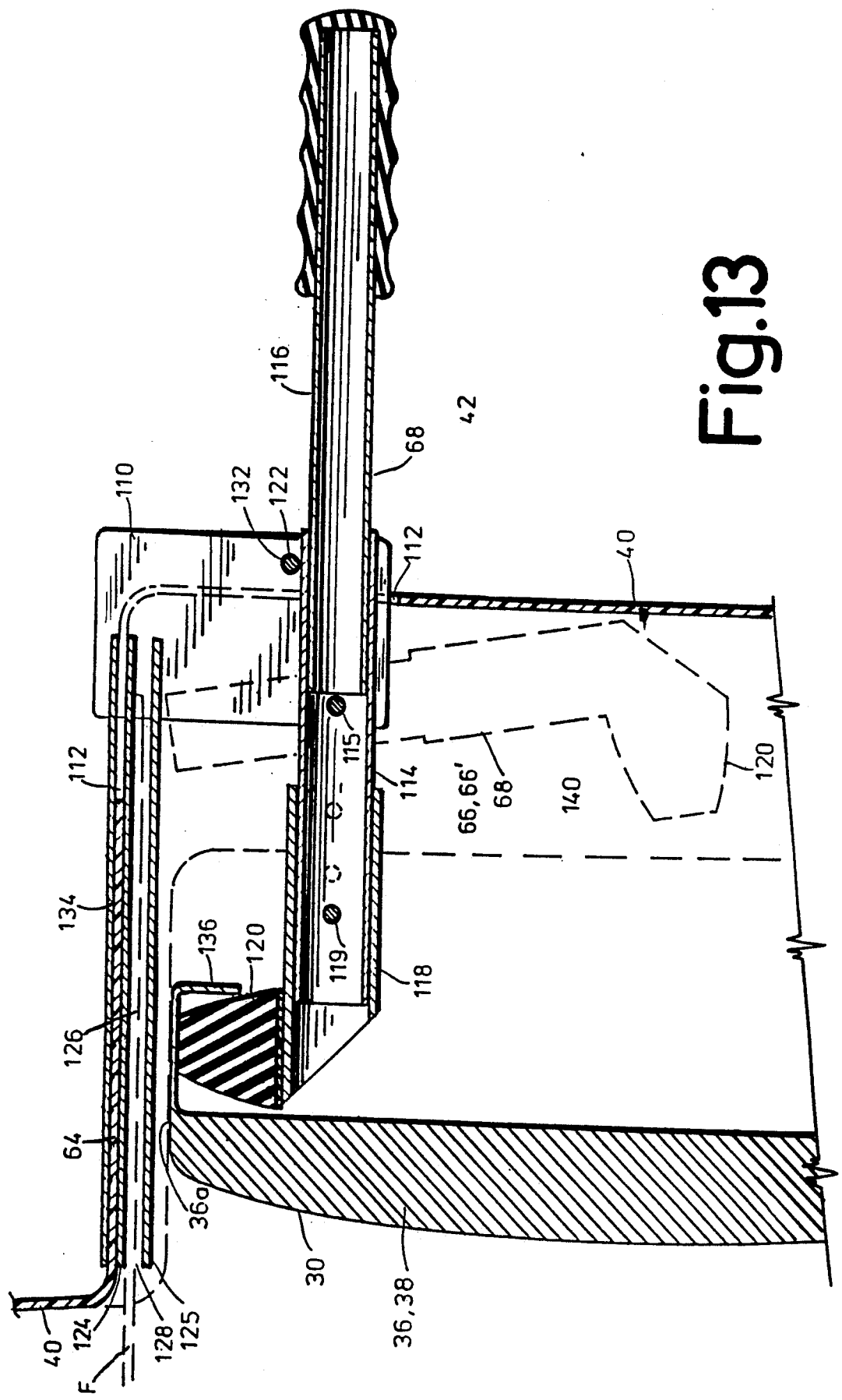

QUICK-RELEASE LOCK FOR PICK-UP TRUCK TOPPER

FIELD OF THE INVENTION

This invention relates to toppers for enclosing the rear box of pick-up trucks, and more particularly to an improved theft-deterrent yet releasable lock that secures the topper to the truck.

BACKGROUND OF THE INVENTION

Theft of motor vehicle or of motor vehicle parts are currently on the rise in North Americ, due to economic recession. Various theft-deterring systems have been devised for preventing unauthorised ignition of the motor engine from the motor vehicle proper, some of the most recent of which have become quite effective. Unfortunately, these systems, while preventing a burglar from departing with the whole vehicle, do not prevent those burglars from detaching and pulling vehicle parts out from the vehicle, for example, the wheels.

Fleets of commercial vehicles in large parking spaces are among the preferred targets of burglars, during overnight periods. These commercial vehicles, for example pick-up trucks with expensive materials loaded inside the topper, are prime targets, particularly the content of the topper proper which is supported over the rear box of the pick-up truck. Obviously, it would be preferable that, at the end of each day, the topper be detached and released from the pick-up truck for storing at a separate location where security would be much tighter. An added advantage would be that the pick-up truck, free of the topper, could be used for alternate purposes, which would enhance efficiency of operations. Moreover, it often happens that, in large van fleets, e.g. of utility companies, a specific van with tools and equipment is assigned to a specific drivertechnician. A problem arises when the vehicle requires repairs or servicing, putting out of commission not only the vehicle but also the tools, the equipment and the driver.

Unfortunately, the complexity of current securing means for securing the topper to the pick-up truck box is high, and release thereof usually requires specialized tools and at least two workers. This in effect discourages daily removal of the topper loaded pick-up truck, especially with large commercial fleets.

Among the prior art, U.S. Pat. No. 3,868,088 issued in 1975 to Reeves teaches that it is known to provide a Jack assembly for raising a topper 24 from the box 36 of a pick-up truck 10, in view of releasing the topper from the truck by moving the latter forward. This jack assembly consists of two pairs of self-standing upright side legs 50, 50 having inturned horizontal cylindrical elbows 20. Elbows 20 releasably engage cylindrical channels 22 in mounting brackets 26 at the exterior front and rear lateral side wall portions of the topper 24.

U.S. Pat. Nos. 4,648,649 issued in 1987 to Beal, and No. 4,815,787 issued in 1989 to Hale, teach means for releasably anchoring a topper to the top edge of the side walls of a pick-up truck box. These toppers are of the open type, i.e. that they do not include an integral bottom flooring and stop about the top edge level of the side walls of the pick-up truck box.

The Beal reference is interesting in that it discloses in FIG. 4 a cam fastener 50, operatable from the inside of the topper enclosure 10, to releasably anchor the top horizontal edge portion 18 of the side wall 15 of a pick-up truck box, through a dovetail Joint type assembly of rail members 20, 23. By rotating the bolt part 35 of the cam fastener 50 through its top head 50 located inside the topper enclosure 10, rails 20, 23 may be released from one another, to release the topper 10 from the truck 15. When cam fastener 50 interlocks rails 20 and 23, and by closing and locking the tail gate 17 of the pick-up truck, the topper 20 becomes a self-enclosed structure. Unauthorized access to the topper enclosure, and thus to interior cam fasteners 50, is thus prevented, whereby unauthorized release of the topper from the box is also prevented.

U.S. Pat. No. 3,572,821 issued in 1971 to Van Antwerp discloses a rocking fastener 34 for securing a tarpaulin 27 over the box 14 of a pick-up truck 12. Each fastener 34 is pivotally carried by fore and aft extending horizontal rods 31 and 32, extending proximate the side walls 18 of the pick-up truck box 14, inside the latter. The lower end of fastener 34 carries a hook 40 pivotally biased by spring 37 toward the corresponding box side wall 18, to automatically hookingly engage the downturned inner flange 16 of the top edge portion 15 of side wall 13. Again, upon closing tail gate 20, a self-enclosed area is achieved inside topper enclosure 14.

U.S. Pat. No. 5,018,777 issued in May 1991 to Swenson, Grove & Grove, is directed more particularly to a hinged fastener 70 for preventing unauthorized release of a topper from a pick-up truck box. Fastener 70 includes an upper arm 72, integral to the topper side wall bottom edge portion 27, and a lower arm 52, integral to the top edge of the box side wall 17, a hinge mount 86 interconnecting arms 52 and 72, and a padlock 73 operated by a cylinder key 76. The padlock cylinder 75 opens into the topper enclosure.

OBJECTS OF THE INVENTION

It is therefore the main object of the invention to provide a locking assembly for securing a self-enclosed topper inside the rear box of a pick-up truck, which would enable a single operator to easily and quickly install or remove the topper yet preventing unauthorized release therefrom.

A corollary object of the invention is to provide such a topper, being capable of easy transfer from one pick-up truck to another.

Further objects of the invention include: providing novel and greatly increased versatility to a pick-up truck having an enclosed lockable topper which is:

(a) quickly and easily installed and removed as a one-man operation, with equipment which is provided as a standard part of the topper;

(b) adaptable, without modification, to various sizes and makes of pick-up trucks.

SUMMARY OF THE INVENTION

In accordance with the objects of the invention, there is disclosed a connector assembly for use in releasably interconnecting a topper supported into a pick-up truck box, said topper forming a self-enclosed enclosure and defining a pair of opposite lateral side walls each of which includes a transverse, intermediate, horizontal offset section delimiting a lower interior section and an upper, exterior vertical section; said box defining a bottom bed and a pair of opposite lateral side panels each having a top edge portion provided with a transverse, inwardly extending rigid flange; wherein said connector assembly includes: (a) a tubular, elongated rocker arm member, to be mounted to each said topper side wall lower section, in register with an aperture made therein, said rocker arm member defining a first abutment end and a second handling end; (b) means for relative movement of said rocker arm member between an operative position, in which said rocker arm first end extends beneath a corresponding said side panel top flange and forcibly applies an upwardly directed bias thereon, and said rocker arm second end extends into said topper enclosure, and an inoperative position, in which said rocker arm first end clears said box side panel top flange; (c) lock means, for releasably locking said rocker arm member in its said operative position.

It is understood that the present invention will provide a solution to the problem outlined in the above-noted background of the invention paragraph, namely, that the vehicle will become temporarily out of commission - an inefficiency. By installing a quick-release, lockable topper onto a pick-up truck, the function of a van can be virtually duplicated while offering a unique advantage. When the base pick-up truck requires servicing, the topper containing all the technician's tools and equipment may be quickly removed from one pick-up truck and installed on another operative unit, thereby greatly reducing the downtime of the technician and his equipment. This system could significantly increase the efficiency and lower operating costs of van fleets.

BRIEF DESCRIPTION OF THE DRAWINGS

FIG. 6 is a side elevation of the topper opposite the side from FIG. 4;

FIG. 7 is a bottom plan view of the topper;

FIGS. 8-9 are rear elevations of the first and of a second embodiment respectively of topper;

FIG. 10 is a cross-sectional view of a portion of topper side wall, with the interior area of the topper being located on the right hand side of the figure and further showing the connector assembly which edgewisely interconnects the two half portions of the topper and which concurrently support an inner cupboard, the latter shown only fragmentarily;

FIG. 11 is an exploded view of the connector assembly of FIG. 10;

FIG. 13 is a partly schematic cross-sectional view of the associated side walls of the truck box and topper with the interior area of the topper being located on the right hand side of the figure, and further showing the lock handle assembly in operative, topper and box interlocking condition, in full lines, and in inoperative condition, in phantom lines.

DETAILED DESCRIPTION OF THE INVENTION

Figure 1:
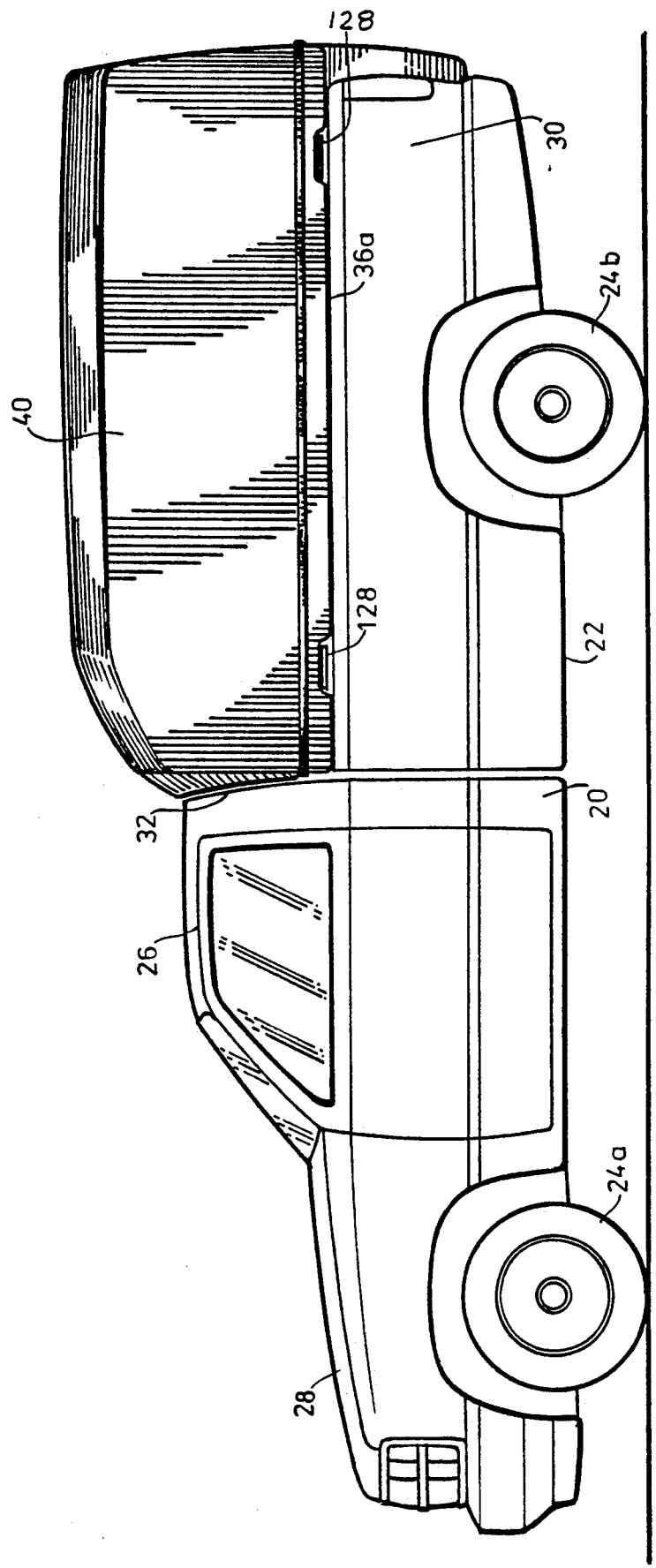
FIG. 1 is a side elevation of a pick-up truck provided with a topper enclosing its open box.
Figure 2:
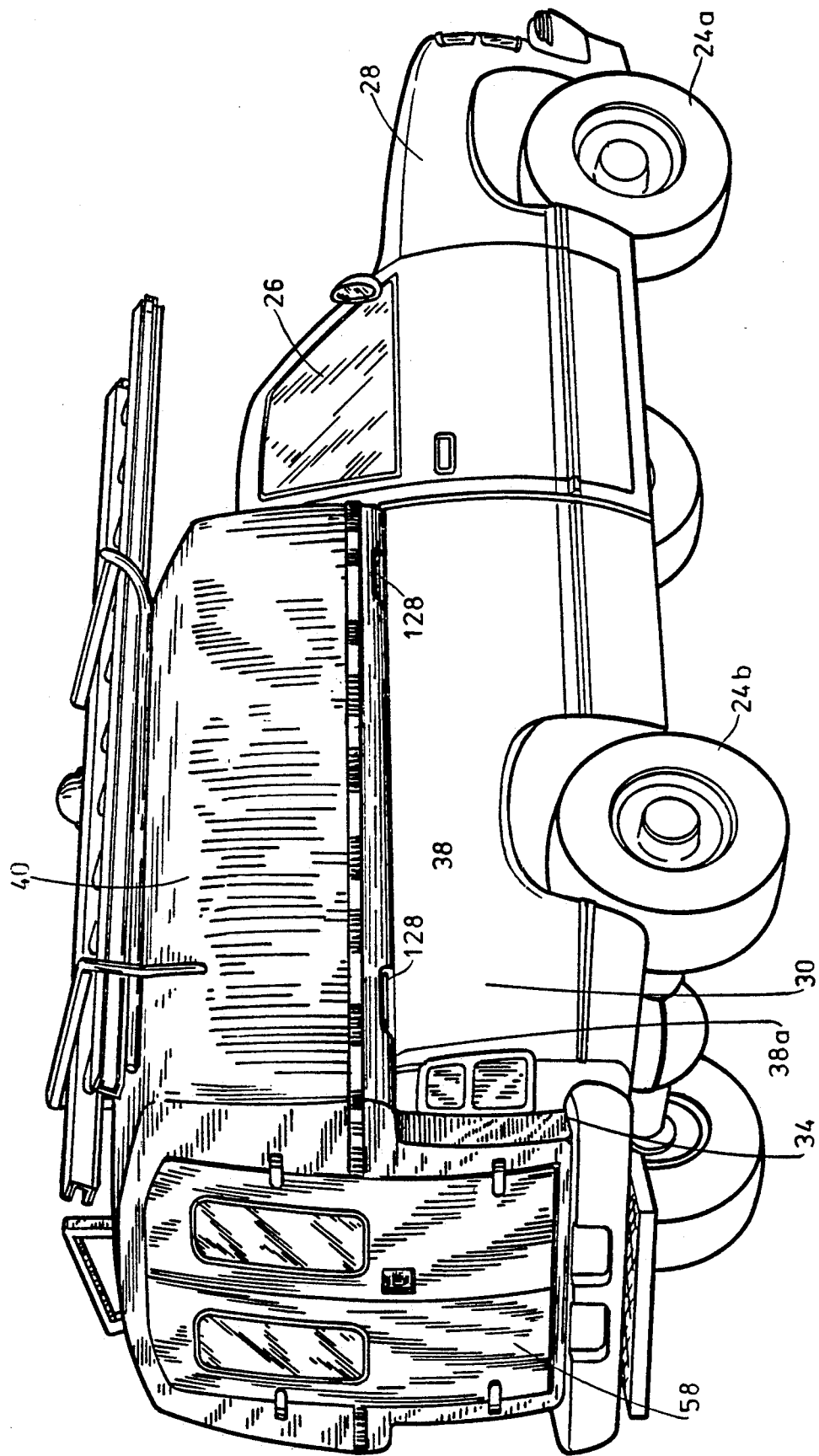
FIG. 2 is a perspective view of the pick up truck.
Figure 3:
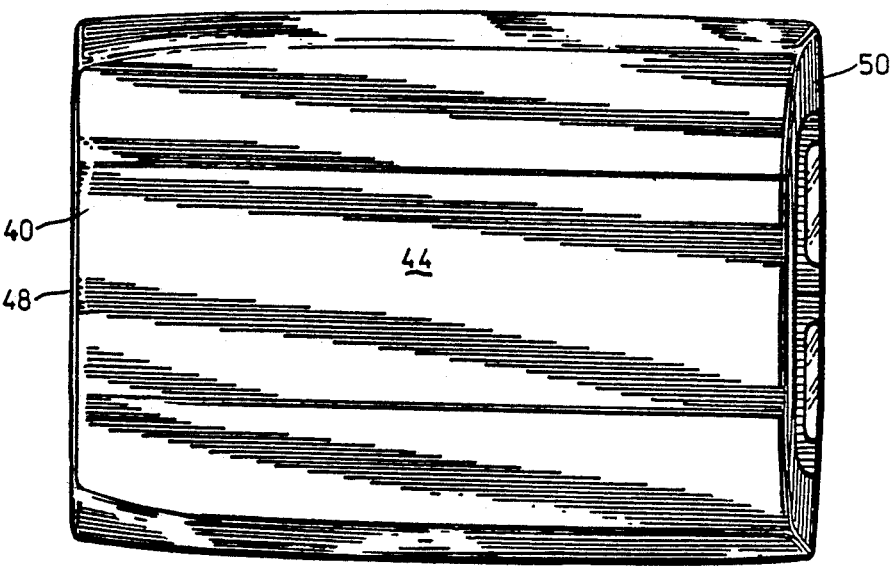
FIG. 3 is a top plan view of a first embodiment of topper.
Figure 4:
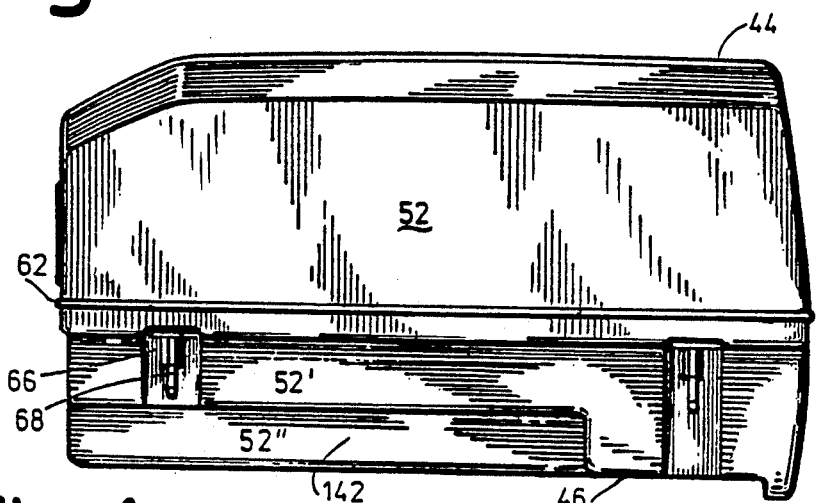
FIGS. 4-5 are side and front elevations respectively of the topper.

Pick up truck 20, illustrated in FIGS. 1-2, conventionally consists of a small road-going vehicle, including a chassis 22 and front and rear wheels 24a, 24b supporting the chassis 22 over ground through suspension means (not illustrated). Chassis 22 itself supports an intermediate passenger cabin 26, a wheel driving motor unit 28 overlying the front wheels 24a in front of cabin 26, and an open box overlying the rear wheels 24b at the rear of cabin 26. Cabin 26 defines a rear, generally upright wall 32 corresponding to the front wall of box 30. Box 30 defines a generally horizontal bed 34, two generally upright side walls 36 and 38, and the front upright wall 32. Bed 34 extends at the level of the bottom edge portion of upright front wall 32. The box side walls 36, 38 define substantially coplanar and horizontal, top edges 36a and 38a respectively, these side walls top edges 36a, 38a being at a height intermediate that of the bottom and top edge portions respectively of the box front wall 32. Side walls 36, 38 have a relatively substantial thickness, each defining inner and outer faces.

It is understood that the ground height of the box bed 34 and that of the box side walls top edges 36a, 38a are a function of the selected said wheel suspension means. Moreover, it is understood that the height of the bed 34 and that of the side walls top edges 36a, 38a will change as a function of the useful load supported by the bed. It will also be readily recognized that, during loading of a load into a free bed 34, the bed 34 and the side walls top edges 36a, 38a will progressively sink during the process, responsively to the weight bias of the load being applied on the wheel suspension means; whereas during unloading of a load from a loaded bed 34, the bed and the side walls top edges 36a, 38a will progressively raise under resilient spring-back bias of the wheel suspension means.

Box 30 may support a variety of light loads, e.g. tools, bags of peat moss or cement mix, et al. one possible use is also that of supporting a so-called topper unit, 40, illustrated in FIGS. 1-9 of the drawings. A topper 40 is a large, rigid housing, generally conforming to the useful inner volume of the box 30 up to the level of the height of the front wall 32 of box 30. Topper 40 defines an inner weatherproof enclosure 42, delimited by top and bottom walls 44 and 46, front and rear walls 48 and 50, and lateral side walls 52 and 54. Rear wall 50 includes an aperture 56 for receiving a door assembly—either a double hinged door 58 (FIGS. 2-3 and 8) or a single hinged door 60 (FIG. 9). Door aperture 56 allows through-passage of a person for access into topper enclosure 42, e.g. for providing weather-shielded work or sleeping accommodations.

Figure 5:
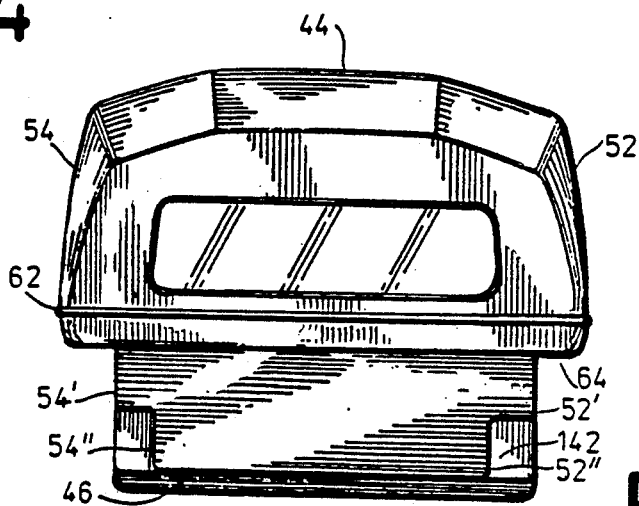

Topper unit 40 consists of two half-portions: an upper half portion 40a, and a lower half-portion 40b in superimposed fashion. As best seen in FIGS. 5 and 8-9, upper half portion 40a is generally rectangular in cross-section, while lower half portion 40b is generally T-shape in cross-section. Half-portions 40a and 40b are interconnected by a connector assembly 62—FIG. 10—detailed later.

Accordingly, bottom wall 46 of topper 40 is of smaller width relative to top wall 44 thereof, to fit flatly over box bed 34, while the generally upright side walls of the topper lower half portion will bear flatly against the inner faces of the box side walls 36, 38. The top head of the cross-sectionally T-shape topper lower half portion 40b defines laterally opposite, generally horizontal underfaces 64, 64' destined to freely abut against the wide, horizontal, flat top edge portions 36a, 38a of the box side walls. Hence, box top edges 36a, 38a form flat, edgewise lateral seats or tracks for supporting the topper horizontal surfaces or rails 64, 64'.

The body of topper 40 may pgoject rearwardly slightly beyond the rear end of box bed 34 and side walls 36, 38, as well as upwardly slightly beyond the top edge level of front wall 32, see FIG. 1.

As illustrated in FIGS. 4-7 of the drawings, the two opposite lateral corners of topper 40, about flooring 46, include an inturned recess 142 extending from an intermediate section of the topper (frontwardly of the aft-located pairs of locking bars 68) to the front end thereof and opening frontwardly of the topper, through the plane of the topper front wall 48. Recess 142 defines vertical side walls 52'', 54'', being coextensive with and interiorly located relative to, side walls 52', 54', as well as with exterior side walls 52, 54. The box bed defines conventional mud-guard casings (FIGS. 1-2) overlying the two rear wheels 24b. Casings project upwardly from the general plane of the bed 34, integral to the bed and adjacent the box side walls 36 and 38, up to a level usually below that of the top edges of side walls 36 and 38. The lengthwise recesses 142 are destined to clear the upwardly projecting rear wheel casings, as the pickup truck 30 is driven forwardly to release the ground supported, box overlying, self-standing topper 40.

According to the invention, each horizontal, offset, lateral portions 64, 64' of topper 40 includes a pair of lengthwisely spaced, laterally outwardly opening, narrow recesses 66, 66' one at the front portion thereof and the other at the rear portion thereof.

Each recess 66, 66' is of a dimension to receive the load-bearing plate F, from two pairs of laterally disposed, adjustable, separate, conventional jack stands (not shown), to be provided commercially as an element from an overall set sold with the topper 40. These jack stands, which may be of any make, e.g. the ones illustrated in U.S. Pat. No. 3,868,088, being provided in view of raising topper 40 from box 30. By raising topper 40, one is able to release same from the latter when the handle lock assembly 68 (detailed below) has been deactivated, simply by moving pick up truck 20 relative to topper 40.

The removal of topper 40 from the pick up truck box 30 is possible by following these three steps:

(a) releasing the four locking assemblies 68 to their inoperative conditions;

(b) raising topper 40 slightly on adjustable Jack stands F, to a height sufficient to clear the truck box bed 34; and (c) driving the truck 20 forwardly, away from the topper 40, when the latter is self-supporting over ground by the Jack stands F.

As already explained hereinabove, during unloading of box 30, the topper loaded box bed 34—and thus the jackstand plate receiving topper recesses 66—will move concurrently along the vertical due to the spring-back of the wheel suspension means, for a while at least, before the topper 40 is allowed to physically detach from box 30. That is to say, topper unloading with the jackstand plate occurs as a two-step operation: first, topper 40 and underlying box 30 raise together, until a threshold level is reached suspensionwise; then topper 40 will further raise exclusively of box 30.

This insight as to the kinematics of box loading/unloading operations is useful when considering what type of locking means (68) is required for interlocking the topper 40 to the box 30.

Locking means 62, illustrated in FIGS. 10-11, enables interlocking of the upper and lower half-portions 40a, 40b of the topper 40, in superimposed fashion. Locking means 62 consists of two separate extrusions: plates 72 and 74, exteriorly covered by a vinyl strip 70. Vinyl strip 70 and extrusion plate 72 are to interlock with one another and to fit against the exterior face (left hand side of FIG. 10) of the side walls 52 or 54 of both topper half portions 40a, 40b; while extrusion plate 74 is to abut against the interior face (right-hand side of FIG. 10) of the topper side wall.

More particularly, each vinyl strip and extrusion plate 70-74 is rectangular and elongated, extending along the length of side walls 52 and 54. Intermediate extension plate 72 is generally flat, but with two laterally spaced, coplanar, cross-sectionally U-shape, offset ridges 76, 78 being formed, whereby a main intermediate section 80 and two edgewise lips 82 and 84, coplanar to intermediate section 80 are defined.

Flat wall section 76 is applied directly against wall 40a, and flat wall section 78, against wall 40b. Screws 86 are driven through sections 76 and 78, into walls 40a, 40b to anchor the former to the latter. C-shape vinyl strip 70 frictionally engages by its opposite edgewise flanges 88a, 88b the opposite lips 82, 84 of intermediate extrusion 72 while the main flat body of strip 70 flatly abuts against intermediate wall 80 of extrusion 72, wherein screws 86 are concealed from inspection from the exterior of topper 40. Screws 86 secure plate 72 to separate topper parts 40a and 40b in such a fashion that a horizontal edgewise gap 90 be defined between the two topper parts 40a and 40b.

Extrusion 72, by screwing of parts 76, 78, into walls 40a, 40b respectively with screws 86, allow not only to exactly adjust the width of the edgewise gap between walls 40a, 40b, but also ensures that both side walls 40a, 40b become coplanar (since abutting parts 76, 78 are coplanar). Strip 70 conceals screws 86, and further constitute a weatherproof member to prevent water seepage through gap 90.

Interior extrusion member 74 defines an elongated, rectangular, central, cross-sectionally H-shape part 92, having a web 92a and two transverse legs 92b, 92c. The two long free edges of leg 92b form outwardly-diverging flanges 92d. The leg 92c integrally supports on its outer face a transverse elongated tubular member 94. Tubular member 94 is of progressively increasing width in stepwise fashion, when moving away from web 92a, and defines a cross-sectionally pyramidal channel 96 receiving a few bolts 98. The flat outer end 94a of tubular member 94 (away from H-part 92 and perpendicular to web 92a) includes a narrow lengthwise slit 100 for transverse engagement by the stem 98a of bolt 98, exclusively of the exterior bolt head 98b, and exclusively of the bolt stem nut 98c and washer 98d located within channel 96. A pair of integral, cross-sectionally C-shape opposite legs 102, 104 project from wall 94a with the flat free end portions thereof 102a, 104a abuttingly flatly against walls 40a, 40b respectively in register with screws 86, and screwingly impaled by same as clearly shown in FIG. 10.

Hence, the entire integral structure 92-94, 102-104 is anchored by screws 86 to the topper 40.

Preferably, captive bolt 98 supports a rigid sheet part 106 from a cupboard, shelf, sleeping bunk, cabinet or the like structure, located inside the topper enclosure, for convenience of the user: bolt stem 98a extends through a mating bore 106a of sheet part 106, with a flat portion 106b of part 106 abutting directly against wall 94a and with bolt head 98b extending on the free side of sheet part portion 106b. in this way, connector means 62 boasts a dual purpose:

(a) to interlock the two half toppers 40a, 40b, one to the other;

(b) to support over the topper flooring an interior cabinet or the like, inside the topper enclosure.

Figure 12:
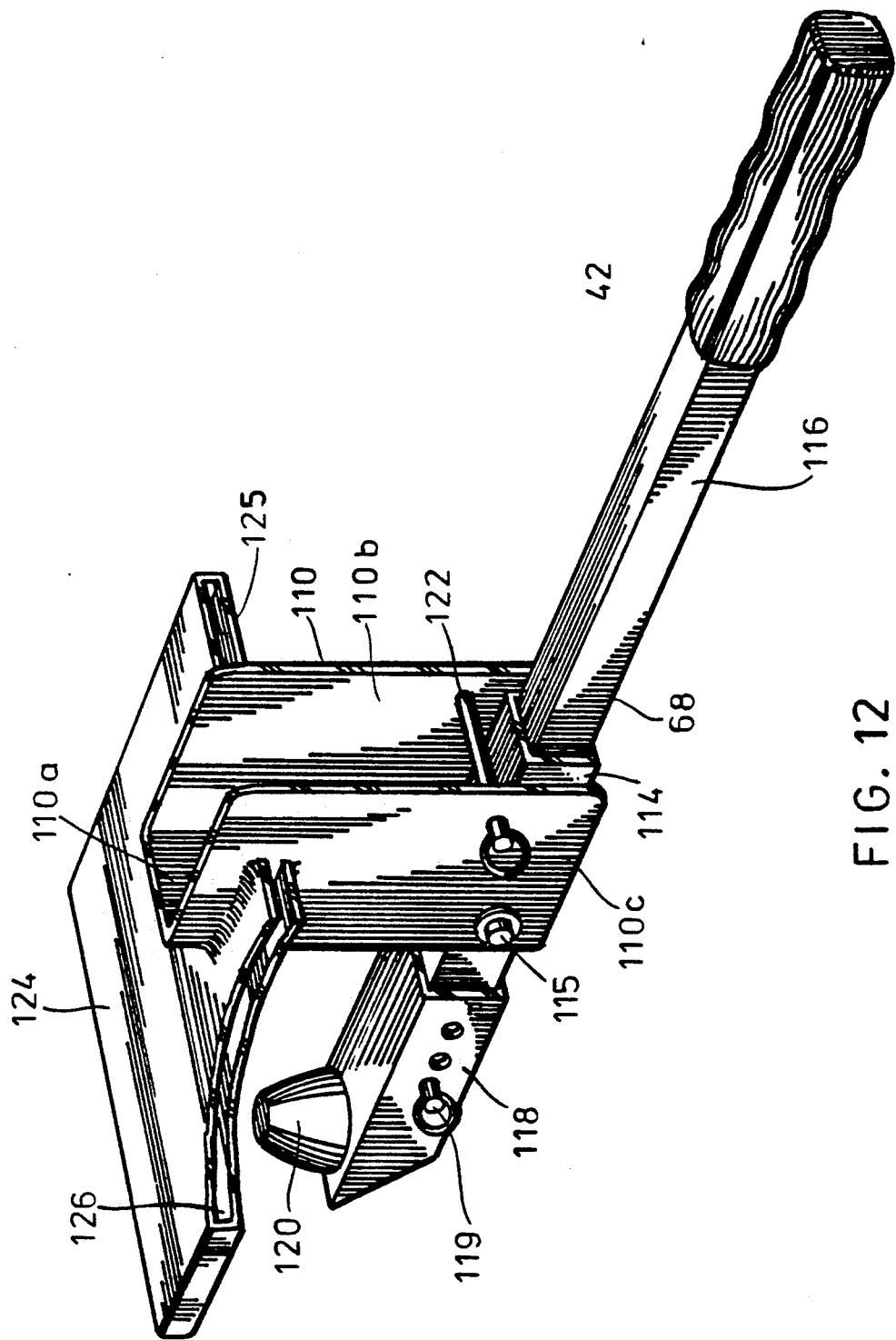
FIG. 12 is a perspective view of the lock handle assembly for releasably locking, from the inside of the topper, the topper to the truck box side walls, the handle bar illustrated on the right hand side of the figure projecting inside the interior area of the topper.

FIGS. 12-13 show the locking means 68 for releasably interlocking, from a location inside the topper enclosure 40, the topper 40 to the box 30 of the pick-up truck. Locking member 68 includes a cross-sectionally U-shape frame 110, extending through an aperture 112 made into the topper side wall 52 (or 54) and into an adjacent portion of horizontal offset 64. The web 110a and two legs 110b, 110c of U-frame 110 extends vertically. A tubular bar 114 is pivotally carried to U-frame 110 by a pivot axle 115 extending through the bottom end of side legs 110b, 110c for rotation about a horizontal axis. Bar 114 includes an inner, releasable, telescopic handle 116 destined to project inwardly into the topper enclosure 40, and an outer telescopic arm 118 destined to project outwardly from topper within box 30 and slightly short of a corresponding wall 36 (or 38) of truck 20. Outer arm 118 carries an elastomeric pad 120 on its top surface, for frictionally and forcibly engaging the underface of the flat top edge portion 36a of the truck box side wall 36. Means are provided to maintain elastomeric pad 120 against seat 36a of the truck box, consisting of a releasable lock pin 122 extending through side legs 110b, 110c at a location both inwardly of and upward relative to pivot axle 116. By inwardly, it is meant that lock pin 122 is located interiorly of the topper enclosure, while pivot axle 115 is located exteriorly thereof.

Frame 110 carries at its upper portion a pair of closely vertically spaced, horizontal plates 124, 125, parallel to one another and projecting outwardly from the topper 40 and destined to extend spacedly over walls 36a (or 38a) underneath offset side wall portion 64 (when the topper 40 sits inside the box 30). Plates 124, 125 define a channel 126 therebetween with an outer horizontal mouth 128 for through engagement by jackstand plates F from a ground standing, adjustable height, self-standing jackplate stand (not illustrated), in view of lifting topper 40 from box 30 when lock 68 is deactivated.

As suggested in FIG. 13, tubular lock 68 is biased, under the weight load of outer end elastomeric pad 120, to pivot in counterclockwise fashion to a generally vertical, inoperative position (or slightly interiorly downwardly inclined position toward topper), shown in dotted lines in FIG. 13, where pad 120 is at the bottom end thereof.

To reach the inoperative position of tubular lock 68, telescopic handle 116 must first be completely retracted and then brought by counterclockwise motion to its generally vertical position. Moreover, aperture 112 in side wall 52' or 54' of topper 40 is required, to allow through passage of bar 116.

In inoperative position as shown in phantom lines in FIG. 13, arms 114 and 118 with the neoprene bumper assembly, fit neatly into a corresponding recess 140 (see also FIG. 7) made in the sides of the topper. This is relevant in that, when the topper 40 is being installed or removed from the truck 20, there must be no transverse protrusion that could catch on the truck bed 34 or box side walls 36 or 38, as the truck is being driven forward and away from the topper during topper release.

More particularly, it is understood that U-shape frame 110 of each topper locking assembly 68 is most preferably engaged into a small inturned recess 140 made in the (vertical) side wall 52' or 54' (FIG. 9) of the (narrower) lower half portion 40b of topper 40. Recess 140 is directed toward the interior enclosure of topper 40, in such a way that, in the inoperativie position of locking assembly 68, and as clearly suggested in FIG. 13, handle 116 including bars 114 and 118 and neoprene bumper 120, remain located entirely interiorly of the plane defined by the corresponding topper side wall 52' or 54'. That is to say, handle member 114-120 in inoperative position, does not project through this plane of wall 52' or 54'. This in turn enables free sliding motion of topper side walls 52', 54' along the ground standing, box overlying, released topper 40, i.e. prevents handle member 114-120 from hindering this truck motion by striking edge portions of the pickup truck which could then lead to undesirable tilting of the topper during topper release from truck box 30.

In the operative position of tubular lock 68, shown in full lines in FIG. 13, bar 114 is pivoted about a vertical plane, clockwisely by manual handle 116 from within the topper enclosure 40, to bring neoprene bumper 120 abuttingly against the underface of seat 36a. Lock pin 122 is then engaged in a through-bore 132 made in vertical frame plates 110b, 110c immediately above the level of pivot arm 114—and on the interior side of topper relative to the pivot axis 116 of pivot arm 114—to maintain tubular lock 68 in its operative horizontal position, against the pivotal bias from pad 120. In this operative position of tubular lock 68, topper 40 becomes integral to the pick-up truck 20, since topper seat 120, bearing against the truck underface 36a, effectively prevents upward and lateral release of the topper 40 from within the truck loaded box 30.

Preferably, bumper arm 118 includes telescopic means 119, to adjust its length to fit pick-up trucks of varying box inner widths.

Since the horizontal Jack plates 124, 125 are anchored to vertical frame 110 of topper 40 and the upper Jack plate 124 flatly abuts against the underface of the horizontal offset (36a or, 38a) of topper side walls (36 or 38), lifting of topper 40 by jackstand plate F engaged into horizontal lateral channels 126—once lock 68 is released to its inoperative position—will provide a straightforward, vertical pulling force without any appreciable torsional moment of force being induced through the topper surface. Preferably, a reinforcing metal panel 134 will be anchored in horizontal position over the top face of offset topper wall 64, in direct register with upper Jack plate 124.

Preferably, each horizontal top edge portion 36a, 38a of the pick-up truck 20 includes an inner, downwardly depending vertical flange 136, whereby a neoprene bumper pocket is defined by walls 36, 36a, 136 (and 38, 38a, 136 receive neoprene bumpers 120 of the tubular lock (or rocker arm) 68 in operative position, so as to prevent lateral sliding and vertical motion of topper 40 inside box 30 during road-going conditions of vehicle 20.

I claim:

1. A connector assembly for use in releasably interconnecting a topper supported into a pick-up truck box, said topper forming a self-enclosed enclosure and defining a pair of opposite lateral side walls each of which includes a transverse, intermediate, horizontal offset section delimiting a lower interior section and an upper, exterior vertical section; said box of the type defining a bottom bed and a pair of opposite lateral side panels each having a top edge portion provided with a transverse, inwardly extending rigid flange; wherein said connector assembly includes:
  (a) a tubular, elongated rocker arm member, to be mounted to each said topper side wall lower section, in register with an aperture made therein, said rocker arm member defining a first abutment end and a second handling end;
  (b) means for relative movement of said rocker arm member between an operative position, in which said rocker arm first end extends beneath a corresponding said side panel top flange and forcibly applies an upwardly directed bias thereon, and said rocker arm second end extends into said topper enclosure, and an inoperative position, in which said rocker arm first end clears the corresponding said box top flange and side panel, through an intermediate sweeping motion which clears said side panel; wherein said rocker arm member first end includes an elastomeric abutment member, the latter compressingly engaging the underface of said box side panel top flange in said operative position of rocker arm member; and
  (c) lock means, for releasably locking said rocker arm member in its said operative position.

2. A connector as defined in claim 1, further including telescopic means, to adjustably extend said rocker arm member first end to fit truck boxes of various width.

3. A connector as defined in claim 1, further including releasable telescopic means, to extend said rocker arm member second handling end whereby the latter extends generally horizontally inside said topper enclosure in said operative position thereof.

4. A self-enclosed topper for fitting inside a pick-up truck box and forming a self-enclosed enclosure and defining a pair of opposite lateral side walls each of which includes a transverse, intermediate, horizontal offset section delimiting a lower interior section and an upper, exterior vertical section; said box of the type defining a bottom bed and a pair of opposite lateral side panels each having a top edge portion provided with a transverse, inwardly extending rigid flange; said topper further including a connector assembly, for use in releasably interconnecting a topper supported into a pick-up truck box, wherein said connector assembly includes:
  (a) a tubular, elongated rocker arm member, to be mounted to each said topper side wall lower section, in register with an aperture made therein, said rocker arm member defining a first abutment end and a second handling end;
  (b) means for relative movement of said rocker arm member between an operative position, in which said rocker arm first end extends beneath a corresponding said side panel top flange and forcibly applies an upwardly directed bias thereon, and said rocker arm second end extends into said topper enclosure, and an inoperative position, in which said rocker arm first end clears the corresponding said box top flange and side panel, through an intermediate sweeping motion which clears said side panel;
  (c) lock means, for releasably locking said rocker arm member in its said operative position; and
  (d) a generally horizontal rigid channel member, integrally carried by the underface of each said transverse offset section of topper side wall, each said channel member defining an outwardly opening mouth for through engagement by a jackstand plate, on both lateral sides of said topper, for raising said topper over and releasing said box bed.

5. A topper as defined in claim 4, further including reinforcement means, for structurally reinforcing in integral fashion said channel members and the corresponding said topper lateral side walls.

6. A topper as defined in claim 4, wherein said self-enclosed topper consists of an upper half section and a lower half section edgewisely interconnected to one another and further including an extrusion member for interconnecting the two said half-sections, wherein said extrusion member further anchoring and supporting a cupboard, a cabinet against an interior wall defined by said topper enclosure.

* * * * *